United States Patent Office 3,692,680
Patented Sept. 19, 1972

3,692,680
STABILIZATION OF ORGANIC SUBSTANCES
Henryk A. Cyba, Evanston, Ill.
(30 Algonquin Road, Des Plaines, Ill. 60016)
No Drawing. Continuation-in-part of application Ser. No. 780,601, Dec. 2, 1968, now Patent No. 3,598,855. This application Dec. 21, 1970, Ser. No. 100,439
Int. Cl. C10m 1/54
U.S. Cl. 252—49.6
9 Claims

ABSTRACT OF THE DISCLOSURE

Stabilization of organic substance by incorporating therein a stabilizing concentration of a cyclic borate of polymeric alkanolamine. One example is the stabilization of plastics and another example is the stabilization of hydrocarbon distillates.

CROSS REFERENCE TO RELATED APPLICATION

This is a continuation-in-part of application Ser. No. 780,601 filed Dec. 2, 1968, now Pat. No. 3,598,855.

DESCRIPTION OF THE INVENTION

This invention relates to the stabilization of organic substances by incorporating therein a novel additive comprising a cyclic borate of a polymeric alkanolamine.

The novel cyclic borate is of the following structural formula:

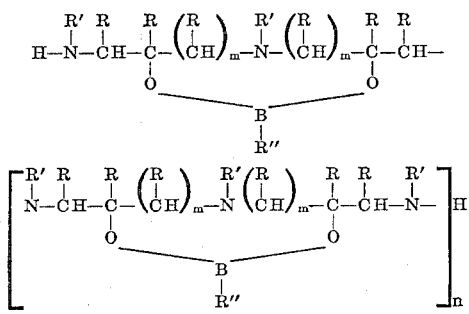

where R is hydrogen, alkyl of from one to 40 carbon atoms, cycloalkyl, aryl or alkaryl, R' is alkyl of from one to 40 carbon atoms, cycloalkyl, aryl or alkaryl, R" is hydroxy, alkoxy of from one to 40 carbon atoms, alkyl of from one to 40 carbon atoms, cycloalkyl, aryl or alkaryl, n is from one to 100, preferably from two to eight and m is zero, one or two.

The cyclic borate is readily prepared by the reaction of a suitable borylating agent with a polymeric alkanolamine prepared according to U.S. Patent 3,189,652. In general, the polymeric alkanolamine is prepared by reacting a suitable amine with an epihalohydrin compound. In the method disclosed in Patent 3,189,652, the amine used as a reactant is selected from primary aliphatic amines containing from 12 to 40 carbon atoms and N-aliphatic polyamines incluing N-alkyl-1,3-diamino-propanes in which the alkyl contains at least 12 carbon atoms, and N-aliphatic ethylenediamines, N-aliphatic diaminobutanes and N-aliphatic diaminopentanes, N-aliphatic diaminohexanes, etc. in which the aliphatic group contains from 12 to 40 carbon atoms. Preferred primary aliphatic amines are mixtures of hydrogenated tallow amines which are available under various tradenames including "Alamine H26D" and "Armeen HTD." These products comprise mixtures predominating in alkylamines containing 16 to 18 carbon atoms per alkyl group. Preferred N-aliphatic-1,3-diaminopropane is a mixture available commercially as "Duomeen T" which is N-tallow-1,3-diaminopropane predominating in alkyl and alkenyl groups containing 16 to 18 carbon atoms each. Other mixtures include those available commercially as N-coco-1,3-diaminopropane, N-soya-1,3-diaminopropane, etc.

The use of these amines in preparing the polymeric reaction product results in compounds in which R' is alkyl of from 12 to 40 carbon atoms. When the amine is an N-aliphatic diaminopropane, m in the above formula is one. In another embodiment, the primary aliphatic amine contains from one to 12 carbon atoms and the N-aliphatic polyamine contains from one to 12 carbon atoms in the aliphatic group. The use of these amines results in compounds in which R' is an alkyl group of from one to 12 carbon atoms. Accordingly, R' may be an aliphatic group of from one to 40 carbon atoms.

The amine is reacted with an epihalohydrin compound. Epichlorohydrin is preferred. Other epichlorohydrin compounds include 1,2-epi-4-chlorobutane, 2,3-epi-4-chlorobutane, 1,2-epi-5-chloropentane, 2,3-epi-5-chloropentane, etc. In general, the chloro derivatives are preferred, although it is understood that the corresponding bromo and iodo compounds may be employed. In some cases epidihalohydrin compounds may be utilized. It is understood that the different epihalohydrin compounds are not necessarily equivalent in the same or different substrate and that, as hereinbefore set forth, epichlorohydrin is preferred.

In general, one or two moles of the amine are reacted with one or two moles of the epihalohydrin compound. The reaction generally is effected at a temperature of from about 20° to about 100° C., preferably 50° to 75° C., although a higher temperature up to about 150° C. may be used, particularly when the reaction is effected at superatmospheric pressure to increase the reaction velocity. Either before or after removal of the reaction product from the reaction zone, the product is treated to remove halogen, generally in the form of an inorganic halide salt. This is effected by reacting the product with a basic compound such as sodium hydroxide, potassium hydroxide, calcium oxide, etc., to form the corresponding metal halide which is removed by filtering, centrifugal separation or in any other suitable method. Following this, heating is continued to form the polymeric reaction product. More specific details are set forth in Patent 3,189,652.

In place of the N-aliphatic amine or polyamine, N-cycloalkylamine or polyamine is used, the cycloalkyl ring containing from three to 20 carbon atoms and preferably is cyclohexyl. Similarly, N-aryl aliphatic amine or polyamine may be employed, the aryl group preferably being phenyl although it may be naphthyl, anthracyl, etc. The aryl ring also may contain one or more alkyl substituents as in tolyl, xylyl, ethylphenyl, diethylphenyl, propylphenyl, dipropylphenyl, butylphenyl, dibutylphenyl, octylphenyl, dioctylphenyl, nonylphenyl, dinonylphenyl, dodecylphenyl, etc.

When in the above formula m is zero, the polymeric reaction product is formed in a different manner. In this method, a dialdehyde or alpha-haloaldehyde, such as chloroacetaldehyde, etc. is reacted with a primary amine, including primary aliphatic amine in which the aliphatic group contains from one to 40 carbon atoms, a cycloalkylamine in which the cycloalkyl ring contains from three to 20 carbon atoms, an aromatic amine in which the aromatic nucleus is phenyl, naphthyl, anthracyl, etc., or alkyl substituted aromatic amine including methylaniline, toluidine, xylidine, ethylaniline, diethylaniline, propylaniline, dipropylaniline, etc. Any suitable dialdehyde is used and may be selected from glyoxal, malonic dialdehyde, succinic dialdehyde, glutaric dialdehyde, xylyl dialdehyde, etc. The reaction generally is effected at a low temperature, below about 100° C. and conveniently room temperature, in the presence of acidic catalyst.

The polymeric alkanolamine is reacted with a suitable borylating agent to form the cyclic borate. The borylating agent is selected from boric acid, boric oxide, tri-lower-alkyl borates, in which the reaction is effected by trans-esterification, or a boronic acid of the formula $$(HO)_2-B-R$$

where R is alkyl of from one to 40 carbon atoms, cyclo-alkyl, aryl and particularly phenyl, or alkaryl and particularly alkylphenyl in which the alkyl contains from one to 30 carbon atoms. The reaction is readily effected by refluxing the reactants, at a temperature within the range of 60° to 200° C., in the presence of a solvent such as benzene, toluene, xylene, etc. Stoichiometric amounts of the borylating agent will be used. This means that one mole proportion of the boron of the borylating agent is used per mole proportion of dialkanolamine moiety in the polymer to be reacted. When R" in the above formula is alkoxy, the reaction is effected using a suitable alkanol containing from one to 40 carbon atoms, in addition to the borate, in order that the free hydroxyl group attached to the boron will react to form the desired compound. Or still preferably borylation, is done with an orthoester of boric acid containing the desired alkoxy substituent. Refluxing is continued until the required amount of water or, when using trialkyl borate, alcohol is collected. Following completion of the reaction, the solvent and alcohol, if any, may be removed by vacuum distillation or any other suitable manner. The cyclic borate may be used as such but preferably is used in a suitable solvent and conveniently the solvent used in its preparation may be retained and the product used as such. However, when desired, the product is prepared as a solution in a different solvent.

The novel cyclic borate of the present invention will have varied utility. In one embodiment, it is used as an additive in hydrocarbon oil including gasoline, naphtha, kerosene, gas oil, fuel oil, lubricating oil, solvent oil, etc. A boron containing additive is presently used in gasoline and the novel cyclic borate of the present invention may be used in a similar manner. In addition to the improvement in combustion properties of the gasoline, the additive also functions as an inhibitor, reduces gum or sediment formation, etc. When used in the other hydrocarbon oils set forth above, the novel cyclic borate serves various functions including one or more of antioxidant, retards gum or sediment formation, corrosion inhibitor, viscosity index improver, pour point depressor, detergent, dispersant, anti-fouling additive, microbicide, etc.

In one embodiment, the cyclic borate of the present invention is particularly useful as an additive in burner oil to inhibit the formation of sediment. The burner oil includes hydrocarbon distillates boiling within the range of from about 150° to about 400° C. and is marketed under various names including burner oil, fuel oil, furnace oil, marine oil, diesel oil, etc.

In still another embodiment, the cyclic borate is used as an additive in lubricating oil which may be of mineral origin or synthetically prepared. In addition to the benefits set forth above, the cyclic borate also serves as a lubricity additive. In still another use, the cyclic borate is employed as an additive in grease which may be of mineral origin or synthetically prepared.

In another embodiment, the borate of the preesnt invention is used as an additive in plastics, resins, solid polymers, etc. In this use, the borate serves as an inhibitor and as a weathering stabilizer to prevent deterioration of the plastic, resin or solid polymer because of oxidation, U.V. light absorption, heat, etc. as well as a dyeing aid or dye site additive, antistatic additive, curing agent for polycarbonate, epoxy resins, etc. In another embodiment, the borate is used as an additive in rubber which may be of natural origin or synthetically prepared. In such use, the additive serves as an inhibitor and also serves to resist deterioration due to ozone attack.

The concentration of cyclic borate to be used will depend upon the particular substrate being stabilized. The concentration may range from about 0.0001% to 15% or more and preferably from about 0.01% to about 2% by weight of the substrate. In hydrocarbon oils undergoing combustion, the additive generally is used in the lower concentration. In plastic, resins or the like, the additive is used in an intermediate concentration. In lubricating oils, either of mineral origin or synthetically prepared, the additive generally is used in higher concentrations.

It is understood that the cyclic borate of the present invention may be used along with other additives generally incorporated in the substrate. The other additives will depend upon the particular substrate. For example, in gasoline, the cyclic borate may be used in conjunction with metal deactivators, detergents, dye, anti-knock agents, etc. as well as an additional antioxidant. In lubricating oil, the other additives may comprise extreme pressure additives, lubricity additives, detergents, pour point depressants, etc. In plastics, resins, solid polymers, the other additives may be additional antioxidants or U.V. stabilizers, as well as these or other compounds which serve in a synergistic manner to improve the overall benefit. These other additives may be of phenolic, amine, phenone, benzotriazole, salicylates, etc. types and one or more thereof may be used in conjunction with the cyclic borate of the present invention. These may be prepared as a mixture and marketed and used in this manner or the different additives may be added separately to the substrate, as desired.

The following examples are introduced to illustrate further the novelty and utility of the present invention but not with the intention of unduly limiting the same.

Example 1

A borate of a polymeric product, as illustrated in the above formula in which R" is hydroxy and n is about five, was prepared in the following manner. The polymeric product was prepared in the manner described in U.S. Patent 3,189,652. A mixture of 387.5 g. (0.5 hydroxyl equivalent) of the polymeric product and 15.46 g. (0.25 mole) of boric acid and 100 g. of benene was refluxed at a temperature of about 135° C. for about two and one-half hours. A total of 10 cc. of water was collected. Following completion of the reaction, the product was filtered and then subjected to distillation at 150° C. under water pump vacuum to remove the benzene solvent. The resultant borate had an acid number of 0.019 meq./g., a basic nitrogen equivalent of 2.54 meq./g., a mole combining weight of 394 and 0.78% by weight of boron.

Example II

Another borate was prepared by the same general steps as described in Example I except that decyl alcohol was reacted along with the boric acid. A mixture of 387.5 g. (0.5 hydroxyl equivalent) of the polymeric product, 15.46 g. (0.25 mole) of boric acid, 39.5 g. (0.25 mole) of decyl alcohol and 100 g. of benzene was refluxed at a temperature of 120–130° C. This water collected from the reaction amounted to 12.5 cc. The reaction product was filtered and vacuum distilled at 170° C. to removt the solvent. The resulting borate had an acid number of 0.027 meq./g., a basic nitrogen equivalent of 2.16 meq./g., a mole combining weight of 463 and 0.93% by weight of boron.

Example III

A borate of another polymeric alkanolamine is prepared as follows: The polymeric alkanolamine is formed by the reaction of one mole proportion of "Duomeen T" and 1.25 mole proportions of epichlorohydrin. As hereinbefore set forth, "Duomeen T" is N-tallow-1,3-diaminopropane and predominates in alkyl groups containing 16 to 18 carbon atoms each. 115 grams of epichlorohydrin, 180 grams of isopropyl alcohol and 159 grams of xylene are loaded into a reaction vessel and the temperature is raised to about 45° C. Then 180 grams of "Duomeen T" and 135 grams of xylene are supplied to the reaction vessel while maintaining the temperature at about 50° C. The reaction vessel then is heated to 75° C. and maintained at this temperature for four hours, after which the remaining amine (180 grams) and 135 grams of xylene are supplied to the reaction vessel and then heated for four hours. Following this primary reaction, 34 grams of sodium hydroxide are added gradually to the reaction vessel which is heated to 85° C. and maintained at this temperature for four hours, after which 17 grams of sodium hydroxide are added gradually to the reaction vessel and maintained at 85° C. for another four hours. Here again, it will be seen that the continued reaction at the elevated temperature after the addition of the sodium hydroxide serves to effect polymerization of the primary reaction product because of the liberation of the free amine. Following the completion of the reaction, the vessel is cooled and the products are filtered to remove the inorganic halide salt and the filtrate then is distilled to remove the isopropyl alcohol solvent.

The borate is prepared by refluxing one hydroxyl equivalent of the above polymeric alkanolamine with 0.5 mole equivalent of nonyl boronic acid in benzene solvent. The refluxing is continued until the required amount of water is collected. The borate of this example corresponds to the formula set forth above in which R" is nonyl.

Example IV

Another borate is prepared as follows: The polymeric alkanolamine is prepared by the reaction of two moles of hydrogenated tallow amine (Alamine H26D) with one mole of epichlorohydrin. It will be noted that the tallow amine is a mixture of primary amines predominating in 16 to 18 carbon atoms per alkyl group. The amine was prepared as a dilute solution in 2-propanol and was supplied to an autoclave and heated to reflux, with stirring. One mole of epichlorohydrin, separately prepared as a solution in 2-propanol, was added gradually to the autoclave and the heating and mixing were continued for about 1.5 hours to insure complete reaction. Thereafter, one mole of sodium hydroxide was added to the autoclave, and the heating and stirring were continued. After completion of the reaction, the mixture was filtered hot to remove sodium chloride, and the filtrate then was distilled to remove the alcohol solvent. The remaining product was a cream colored solid and was recrystallized from hot ethanol to give a white amorphous solid having a softening point of 45° C. and melting at about 67° C. to a clear light yellow liquid, which is soluble in benene, 2-propanol, etc.

The cyclic borate of this example is prepared by refluxing one hydroxyl equivalent of the polymeric alkanolamine with 0.5 mole of trimethyl borate in toluene solvent. The refluxing is continued until the required amount of methyl alcohol is collected. The reaction product is recovered in admixture with the toluene solvent and used in this manner as an additive to burner oil.

Example V

The cyclic borate prepared as described in Example I was used as an additive in burner oil and evaluated according to the method referred to as the "Erdco Test," now called the ASTM-CRF Fuel Coker Test. In this method, heated oil is passed through a filter, and the time required to develop a differential pressure across the filter of 25 in. Hg is determined. It is apparent that the longer the time, the more effective is the additive. However, with a very effective additive, the time to reach a differential pressure across the filter of 25 in. Hg is lengthened beyond reasonable limits so that the test is stopped after about 300 minutes and the differential pressure at that time is reported.

A sample of the burner oil containing 0.001% by weight of the cyclic borate prepared in the manner described in Example I showed no rise in the differential pressure across the filter after 300 minutes in the Erdco Test. A sample of the oil without this additive gives a differential pressure of 25 in. Hg in less than 100 minutes. This demonstrates the high potency of the cyclic borate to inhibit sediment formation in the burner oil.

Example VI

The cyclic borate prepared as described in Example I also was evaluated as an additive in solid polypropylene. The evaluation was made by exposing the samples of the polypropylene to carbon arc rays in a Fadometer. In this evaluation, the polypropylene samples are milled in a two-roll mill of conventional design and the additive, when employed, is incorporated in the sample during the milling. The samples are pressed into sheets of about 17 ml. thickness and cut into plaques of about 1⅜" x 1½". The plaques are inserted into plastic holders, affixed onto a rotating drum and exposed to the carbon arc rays at about 52° C. in the Fadometer. The samples are examined periodically by infrared analysis to determine the carbonyl band at 1715 cm.$^{-1}$ which is reported as the "carbonyl number." The higher intensity of the carbonyl band indicates a higher carbonyl concentration (expressed as carbonyl number) and, accordingly, increased deterioration.

A sample of the polypropylene without additive developed a carbonyl number of greater than 1000 within 120 hours of exposure in the Fadometer. Another sample of the same polypropylene containing 0.15% by weight of butylated hydroxytoluene (2,6-di-tert-butyl-4-methylphenol) developed a carbonyl number of over 1000 within 360 hours of exposure in the Fadometer. Still another sample of the polypropylene containing 1% by weight of the cyclic borate prepared according to Example I and 0.15% by weight of 2,6-di-tert-butyl-4-methylphenol did not reach a carbonyl number of 1000 until 840 hours of exposure in the Fadometer. This shows that the cyclic borate was effective in stabilizing the polypropylene. However, still further improvements are obtained when using the cyclic borate in admixture with one or more other compounds such as 2-hydroxy-4'-octoxybenzophenone, 2, 2'-dihydroxy - 4 - octoxybenzophenone, 2-(2'-hydroxy-5-methylphenyl)-benzotriazole, phenyl salicylate, and preferably also with one or more of butylated hydroxytoluene, 1,1,3 - tris - (2-methyl-4-hydroxy-5-tert-butylphenyl)-butane or dilaurylthiodipropionate.

Example VII

A polymeric borate is prepared by reacting one mole of cyclohexylamine with one mole of epichlorohydrin in substantially the same manner as described in Example IV. The resultant very heavy viscose oil is reacted with tributylborate. Two moles of butanol are evolved per two equivalents of the hydroxyl group. The polymeric product is a cyclic borate where R' in the above formula is a cyclohexyl substituent, R" is a butyloxy residue and $m$ is 1. In the same way a polymeric-cyclic borate is prepared starting with one mole of butylamine and one mole of epichlorohydrin. The resultant cyclic borate, when transesterified as above, contains R' equal to butyl and R" equal to butoxy. When using low molecular weight amines, $n$ in the above formula may range from 20 or 50 to 100 or more.

Example VIII

The cyclic borate prepared as described in Example VII, where R' is butyl, is used in a concentration of 0.005% by weight as an additive to gasoline and serves to improve the burning quality of the gasoline as well as to reduce oxidation deterioration of the gasoline.

Example IX

The cyclic borate prepared as described in Example VII, where R' is cyclohexyl, is used in a concentration of 2% by weight, together with 0.5% by weight of styrenated phenothiazine, as an additive in dioctyl sebacate and serves to improve the stability of this synthetic lubricating oil.

Example X

The cyclic borate prepared as described in Example I is used in a concentration of 0.5% by weight as an additive in butadiene-styrene synthetic rubber and serves to reduce deterioration of the rubber due to oxidation and/or ozone.

The composition of the polymeric alkanolamine, prepared as described in Patent 3,189,652, has not been definitely established. Available evidence indicates that the product is a mixture of compounds. The polymer comprises probably as major component, recurring units of the reaction product of amine and epihalohydrin as illustrated in the formula hereinbefore set forth. Internal cyclization also may occur, as well as crosslinking to form branched chain structure.

Because of the above, it is understood that the borate product also may comprise a mixture of compounds. Furthermore, cross linking may occur during the borylation as, for example, a hydroxyl group of one recurring unit may be linked via boron to a hydroxyl group of a different recurring unit.

I claim as my invention:

1. Hydrocarbon oil normally subject to deterioration due to oxidation, weather or heat containing, as an inhibitor against said deterioration, a stabilizing concentration of a cyclic borate of the following structural formula:

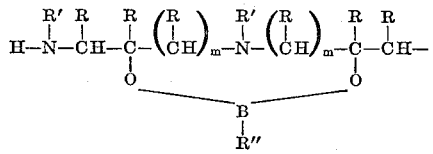

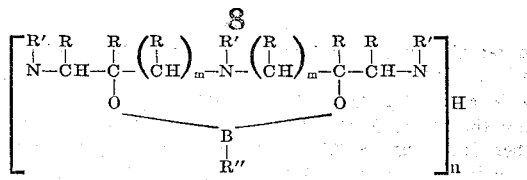

where R is hydrogen, alkyl of from one to 40 carbon atoms, cycloalkyl, aryl or alkaryl, R' is alkyl of from one to 40 carbon atoms, cycloalkyl, aryl or alkaryl, R'' is hydroxy, alkoxy of from one to 40 carbon atoms, alkyl of from one to 40 carbon atoms, cycloalkyl, aryl or alkaryl, $n$ is from one to 100, and $m$ is zero, one or two.

2. The composition of claim 1 wherein $m$ is one, R is hydrogen and R' is alkyl of from 14 to 18 carbon atoms.

3. The composition of claim 1 wherein $m$ is one, R' is hydrogen and R' is cyclohexyl.

4. The composition of claim 1 wherein R'' is hydroxy.

5. The composition of claim 1 wherein R'' is alkoxy of from one to 40 carbon atoms.

6. The composition of claim 1 wherein R'' is alkyl, cycloalkyl or aryl of from six to 12 carbon atoms.

7. The composition of claim 1 with said oil being burner oil.

8. The composition of claim 1 with said oil being gasoline.

9. The composition of claim 1 with the substrate being lubricating oil.

References Cited
UNITED STATES PATENTS

| | | | |
|---|---|---|---|
| 3,189,652 | 6/1965 | Pollitzer | 44—72 X |
| 3,301,888 | 1/1967 | Cyba | 44—77 X |
| 3,422,016 | 1/1969 | Cyba | 252—49.6 |
| 3,560,386 | 2/1971 | Cyba | 44—72 |

DANIEL E. WYMAN, Primary Examiner

W. H. CANNON, Assistant Examiner

U.S. Cl. X.R.

44—62, 72; 252—400